United States Patent
Chen et al.

(10) Patent No.: US 11,461,997 B2
(45) Date of Patent: Oct. 4, 2022

(54) MATCHING METHOD AND APPARATUS, ELECTRONIC DEVICE, COMPUTER-READABLE STORAGE MEDIUM, AND COMPUTER PROGRAM

(71) Applicant: SENSETIME INTERNATIONAL PTE. LTD., Singapore (SG)

(72) Inventors: Kaige Chen, Singapore (SG); Lue Wu, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 130 days.

(21) Appl. No.: 17/071,131

(22) Filed: Oct. 15, 2020

(65) Prior Publication Data

US 2021/0319250 A1    Oct. 14, 2021

Related U.S. Application Data

(63) Continuation of application No. PCT/IB2020/058349, filed on Sep. 9, 2020.

(30) Foreign Application Priority Data

Apr. 9, 2020    (SG) .......................... 10202003292X

(51) Int. Cl.
*G06T 7/73*    (2017.01)
*G06V 10/44*   (2022.01)
(Continued)

(52) U.S. Cl.
CPC .......... *G06V 10/443* (2022.01); *G06K 9/6215* (2013.01); *G06T 7/74* (2017.01);
(Continued)

(58) Field of Classification Search
CPC .. G06V 10/462; G06V 10/757; G06V 10/443; G06V 10/751; G06V 10/48;
(Continued)

(56) References Cited

U.S. PATENT DOCUMENTS 7,254,269 B2 *  8/2007  Nakagawa ........... G06V 30/242
                                                382/197
10,217,312 B1 †  2/2019  McClellan
(Continued)

FOREIGN PATENT DOCUMENTS

CN    110738273 A    1/2020
JP    2015001982 A    1/2015
(Continued)

OTHER PUBLICATIONS

Office Action of the Australian application No. 2020289853, dated Sep. 14, 2021, 5 pgs.
(Continued)

*Primary Examiner* — Ian L Lemieux
(74) *Attorney, Agent, or Firm* — Cooper Legal Group, LLC

(57) ABSTRACT

Provided are a matching method and apparatus, an electronic device, and a computer-readable storage medium. The method includes: obtaining a to-be-matched image; extracting at least one to-be-matched feature point from the to-be-matched image; for one of at least one reference image, performing matching between the at least one to-be-matched feature point and at least one reference feature point extracted from the reference image to obtain a distance set corresponding to the reference image, the distance set corresponding to the reference image being a distance set composed of distances between the at least one to-be-matched feature point and the at least one reference feature point, the one reference image including an image of a
(Continued)

standard sample, and different reference images including different standard samples; and determining, based on the distance set corresponding to each reference image, whether the to-be-matched image matches each reference image.

20 Claims, 9 Drawing Sheets

(51) Int. Cl.
*G06K 9/62* (2022.01)
*G06V 10/48* (2022.01)
*G06V 10/75* (2022.01)
*G06V 10/74* (2022.01)

(52) U.S. Cl.
CPC ............ *G06V 10/48* (2022.01); *G06V 10/751* (2022.01); *G06V 10/761* (2022.01)

(58) Field of Classification Search
CPC .. G06V 10/7515; G06V 10/759; G06V 10/40; G06V 10/44; G06V 20/20; G06V 20/41; G06V 30/418; G06V 40/1365; G06K 9/6215; G06T 7/33; G06T 7/74; G06T 7/337; G06T 7/00; G06T 7/248; A63F 2003/00164; G07F 17/322; G07F 17/3239; G07F 17/3241
See application file for complete search history.

(56) References Cited

U.S. PATENT DOCUMENTS

| | | | | |
|---|---|---|---|---|
| 10,922,582 | B2* | 2/2021 | Baumela Molina | ........................ G06V 10/462 |
| 2006/0123050 | A1* | 6/2006 | Carmichael | ............... G06T 7/35 |
| 2008/0205756 | A1* | 8/2008 | Kamata | .................. G06V 10/50 382/209 |
| 2011/0282897 | A1* | 11/2011 | Li | ........................... G06F 16/29 707/769 |
| 2012/0263388 | A1* | 10/2012 | Vaddadi | .................. G06K 9/62 382/225 |
| 2015/0049955 | A1 | 2/2015 | Stoeffler et al. | |
| 2016/0012311 | A1† | 1/2016 | Romanik | |
| 2016/0148074 | A1* | 5/2016 | Jean | ..................... G06V 10/464 382/190 |
| 2016/0189359 | A1* | 6/2016 | Jo | ...................... G06V 30/2504 382/201 |
| 2016/0350592 | A1 | 12/2016 | Ma et al. | |
| 2017/0061231 | A1* | 3/2017 | Higa | .................... G06V 10/757 |
| 2017/0154204 | A1* | 6/2017 | Ryu | .................... G06V 10/462 |
| 2018/0158199 | A1 | 6/2018 | Wang et al. | |
| 2018/0336700 | A1 | 11/2018 | Gao | |
| 2019/0020817 | A1 | 1/2019 | Shan et al. | |
| 2019/0244054 | A1 | 8/2019 | Romanik et al. | |
| 2019/0266737 | A1 | 8/2019 | Tang | |
| 2019/0332804 | A1* | 10/2019 | Qi | ........................ G06V 40/172 |
| 2020/0394763 | A1* | 12/2020 | Ma | .......................... G06T 5/002 |
| 2021/0227210 | A1* | 7/2021 | Kang | ........................ G06T 5/50 |
| 2022/0058448 | A1* | 2/2022 | Abad Peiro | ............. G06F 16/56 |

FOREIGN PATENT DOCUMENTS

| | | |
|---|---|---|
| JP | 2017187971 A | 10/2017 |
| JP | 2017211765 A | 11/2017 |
| KR | 101234046 B1 | 2/2013 |
| KR | 101999797 B1 | 7/2019 |

OTHER PUBLICATIONS

International Search Report in the international application No. PCT/IB2020/058349, dated Nov. 6, 2020, 5 pgs.
English translation of the Written Opinion of the International Search Authority in the international application No. PCT/IB2020/058349, dated Nov. 6, 2020, 5 pgs.
Notification of material filed by a third party of the Australian application No. 2020289853, dated Jan. 13, 2022, 11 pgs.
First Office Action of the Korean application No. 10-2020-7034854, dated Jan. 28, 2022, 13 pgs.

* cited by examiner
† cited by third party

MATCHING METHOD AND APPARATUS, ELECTRONIC DEVICE, COMPUTER-READABLE STORAGE MEDIUM, AND COMPUTER PROGRAM

CROSS-REFERENCE TO RELATED APPLICATIONS

The present application is a continuation of International Patent Application No. PCT/IB2020/058349, filed on Sep. 9, 2020 and entitled "MATCHING METHOD AND APPARATUS, ELECTRONIC DEVICE, COMPUTER-READABLE STORAGE MEDIUM, AND COMPUTER PROGRAM", which claims priority to Singapore Patent Application No. 10202003292X, filed on 9 Apr. 2020. The disclosures of International Patent Application No. PCT/IB2020/058349 and Singapore Patent Application No. 10202003292X are hereby incorporated by reference in their entireties.

BACKGROUND

At present, in intelligent monitoring system, it is usually required to manually configure different specific monitoring modes according to different function partitions included in a plane layout of a current scene, respectively, so that manual intervention is required during a change in monitoring scenes to manually implement function configuration, so as to continue normal monitoring. In addition, when a monitoring device is interfered or blocked, a prompt is required to be sent in time to implement related maintenance and inspection.

SUMMARY

Embodiments of the present disclosure provide a matching method and apparatus, an electronic device, a computer-readable storage medium, and a computer program capable of improving the intelligence in image matching.

The technical solution of the present disclosure is realized as below.

The embodiments of the present disclosure provide a matching method, including: obtaining a to-be-matched image; extracting at least one to-be-matched feature point from the to-be-matched image; performing, for one of at least one reference image, matching between the at least one to-be-matched feature point and at least one reference feature point extracted from the reference image to obtain a distance set corresponding to the reference image, the distance set corresponding to the reference image being a distance set composed of distances between the at least one to-be-matched feature point and the at least one reference feature point, the one reference image including an image of a standard sample, and different reference images including different standard samples; and determining, based on the distance set corresponding to each reference image, whether the to-be-matched image matches each reference image.

Embodiments of the present disclosure provide a matching apparatus, including a processor, and a memory for storing instructions executable by the processor, where the processor is configured to: obtain a to-be-matched image; extract at least one to-be-matched feature point from the to-be-matched image; perform, for one of at least one reference image, matching between the at least one to-be-matched feature point and at least one reference feature point extracted from the reference image to obtain a distance set corresponding to the reference image, the distance set corresponding to the reference image being a distance set composed of distances between the at least one to-be-matched feature point and the at least one reference feature point, the one reference image including an image of a standard sample, and different reference images including different standard samples; and determine, based on the distance set corresponding to each reference image, whether the to-be-matched image matches each reference image.

Embodiments of the present disclosure provide a computer-readable storage medium, having stored thereon one or more computer-readable instructions, where the one or more computer-readable instructions, when being executed by one or more processors, cause the one or more processors to realize the matching method according to any one of the foregoing embodiments.

By using the aforementioned method to implement the solution, at least one to-be-matched feature point is extracted from a to-be-matched image of a current plane layout, and is subjected to matching with reference feature points in at least one reference image representing different standard samples, so as to obtain the distance set of the to-be-matched image corresponding to each reference image, where the distance set of the to-be-matched image corresponding to each reference image represents the similarity between the to-be-matched image and each reference image. Whether the current plane layout matches a standard sample, and which standard sample is matched are determined according to the distance set of the to-be-matched image corresponding to each reference image, so that preset function implementation in the standard sample is automatically applied in the current plane layout, without manual matching and function configuration, so that the intelligence in image matching is improved.

DETAILED DESCRIPTION

The technical solutions in the embodiments of the present disclosure are clearly and completely described below with reference to the accompanying drawings in the embodiments of the present disclosure. In embodiments of the present disclosure, the matching method provided by the embodiments of the present disclosure is described by taking matching between a plane layout and standard plane layouts as an example.

Figure 1:
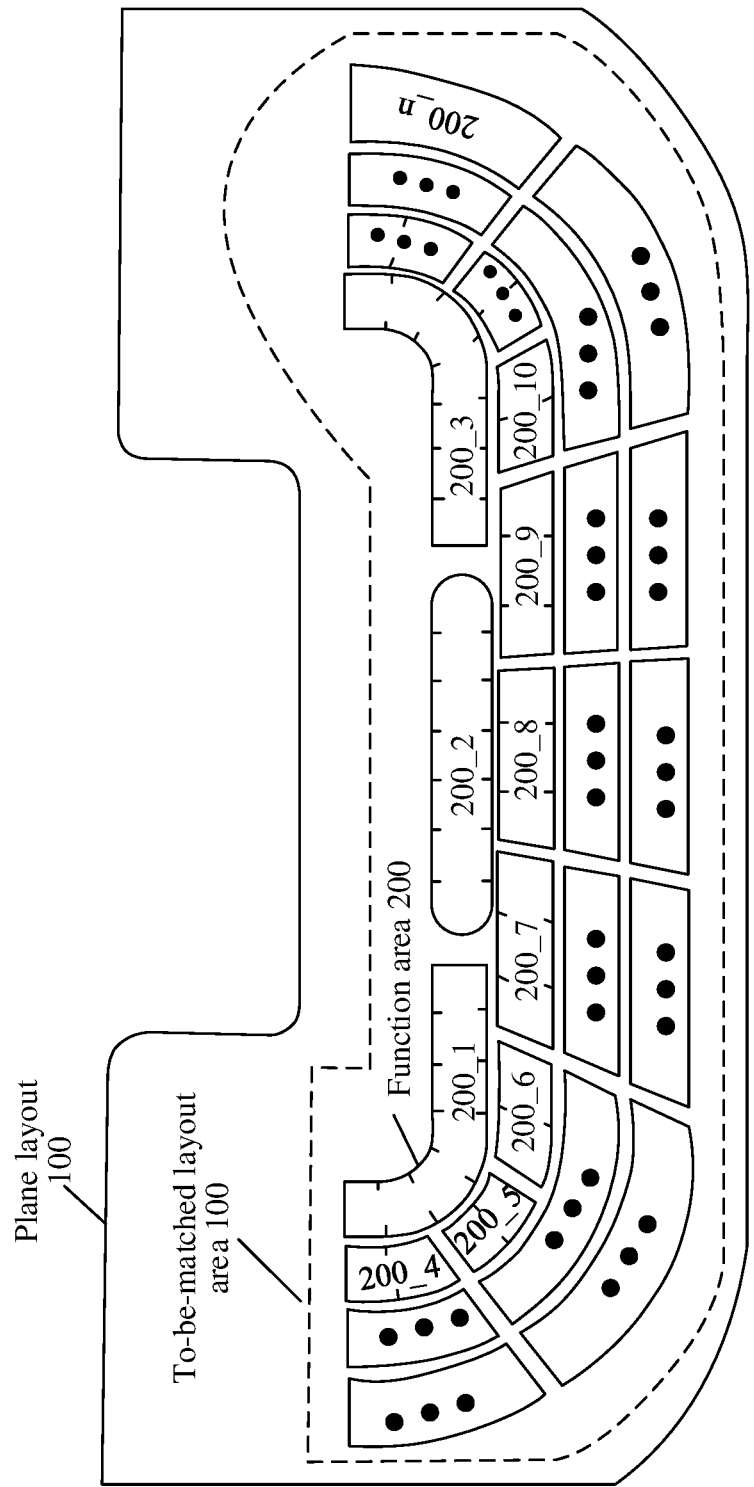
FIG. 1 is a schematic diagram of a plane layout provided by embodiments of the present disclosure.

With reference to FIG. 1, FIG. 1 is a schematic diagram of a plane layout provided by embodiments of the present disclosure. In FIG. 1, a current plane layout 100 may be a tablecloth, a floor plan, or the like. The current plane layout includes at least one function area 200_1 . . . 200_n, and preconfigured different processing methods may be triggered by a change in monitoring images in each function area, for example, the function area 200_1 may automatically collect statistics about the number and value of markers placed therein. Therefore, before formal operation, the current plane layout is required to be subjected to image recognition, and then matching with standard samples of multiple reference plane layouts configured in the function areas in advance. If the current plane layout matches one standard sample, the function implementation configured in the standard sample is applied to the current plane layout, that is, function areas of the standard sample are mapped to the function areas of the current plane layout. If a trigger event is monitored in a certain function area in the at least one function area 200_1 . . . 200_n of the current plane layout, corresponding processing is carried out according to the function implementation configured in the corresponding function area in the standard sample. In addition, if a monitoring device is interfered or blocked, or the current plane layout does not belong to any one of the standards samples, the current plane layout cannot match any one of the reference plane layouts, and at this time, an alarm prompt is required to be provided in time to remind relevant staff to perform maintenance processing.

Figure 2:
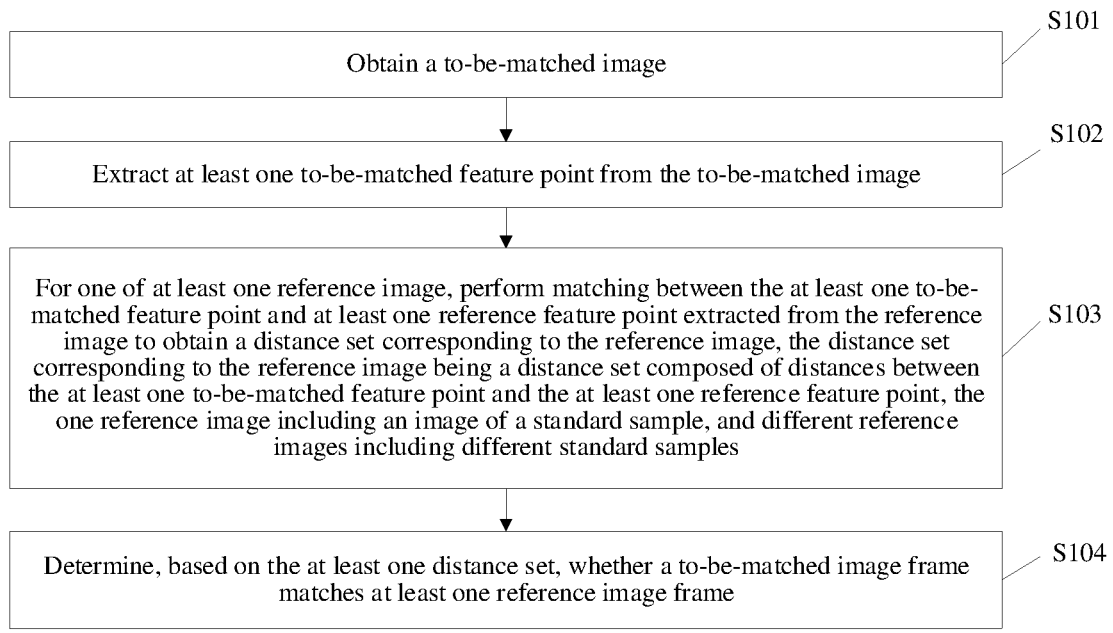
FIG. 2 is a first schematic flowchart of a matching method provided by embodiments of the present disclosure.

In the embodiments of the present disclosure, based on the schematic diagram of the plane layout shown in FIG. 1, FIG. 2 is a schematic flowchart of a matching method provided by embodiments of the present disclosure, including operations S101 to S1104. Description is made with reference to the operations shown in FIG. 2.

At S101, a to-be-matched image is obtained.

The plane layout matching method provided by the embodiments of the present disclosure is applicable to scenes of matching with standard plane layouts when a current plane layout is arranged. Exemplarily, when the current plane layout is monitored, the current plane layout is subjected to matching with standard plane layouts of different layout types (i.e., different standard samples), so as the match the current plane layout with one standard plane layout, so that an intelligent monitoring scene of the function implementation preconfigured in the standard plane layout is applied to the current plane layout.

In the embodiments of the present disclosure, the to-be-matched image may take a variety of forms. For example, in some embodiments, the to-be-matched image may include an image of a tablecloth on a game table, and the image of the tablecloth may include pattern(s) on the tablecloth.

In the embodiments of the present disclosure, an image acquiring device may be configured at a bird's-eye view angle to obtain an aerial view of the current plane layout as a to-be-matched image.

In the embodiments of the present disclosure, part of images may be captured from acquired image frames of the current plane layout as a to-be-matched image.

In the embodiments of the present disclosure, the image acquiring device may be a device such as a camera or a camera lens. No limitation is made thereto in the embodiments of the present disclosure.

In the embodiments of the present disclosure, if the image acquiring device is a camera lens, a to-be-matched image is extracted from an acquired image stream of the current plane layout.

At S102, at least one to-be-matched feature point is extracted from the to-be-matched image.

In the embodiments of the present disclosure, after the to-be-matched image is obtained, at least one to-be-matched feature point is first extracted from the to-be-matched image so as to implement further image matching based on the extracted at least one to-be-matched feature point.

In the embodiments of the present disclosure, the feature point may be a Binary Robust Independent Elementary Feature (BRIEF), or may be in other data forms, which is specifically selected according to actual conditions. No limitation is made thereto in the embodiments of the present disclosure.

In the embodiments of the present disclosure, the at least one to-be-matched feature point is extracted from the to-be-matched image based on a Harris corner detection method in Oriented FAST and Rotated BRIEF and a Features from accelerated segment test (FAST) feature extraction algorithm, which is specifically as follows:

at least one original pixel point is selected from the to-be-matched image, where for each original pixel point in the at least one original pixel point, if a preset number of target pixel points with grayscale values different from the grayscale value of each original pixel point exists in a preset range of each original pixel point, the target pixel points are subjected to feature extraction, so that the at least one to-be-matched feature point is obtained.

In the embodiments of the present disclosure, if a preset number of pixel points with grayscale values different from the grayscale value of the original pixel point exists in the preset range of the original pixel point, for example, grayscale values of pixel points at corners and edges of an object in an image are different from other surrounding pixel points, it indicates that the original pixel point is a corner point representing a corner boundary and has high recognition and representativeness in image recognition, and a feature is extracted from the pixels points in the preset range of the original pixel point and is taken as one to-be-matched feature point.

In some embodiments of the present disclosure, a pixel point P is selected from the to-be-matched image as the original pixel pint, and a circle is drawn around the pixel point P with three pixels as the radius. If there are 12 pixel points with grayscale values greater than or less than the grayscale value of the point P on the circumference, a BRIEF of the pixel value around the point P is extracted and is taken as the to-be-matched feature point corresponding to the point P. 1500 to-be-matched feature points are extracted from the to-be-matched image using the same method above.

In the embodiments of the present disclosure, the to-be-matched feature point may also be extracted using other feature extraction methods. No limitation is made thereto in the embodiments of the present disclosure.

In some embodiments of the present disclosure, after the to-be-matched image is obtained, a to-be-matched layout area is first divided from the to-be-matched image, and a pixel point capable of effectively reflecting a shape profile feature of the to-be-matched layout area and identifying an object in the to-be-matched layout area is extracted from the to-be-matched layout area and is taken as at least one to-be-matched feature point.

In the embodiments of the present disclosure, the to-be-matched layout area represents a to-be-matched area in the current plane layout, the to-be-matched image generally includes multiple pieces of image content information, an image content part capable of reflecting the current plane layout is required to be divided from the to-be-matched image as the to-be-matched layout area, then only the to-be-matched layout area is processed, and the part outside the to-be-matched layout area is not subjected to plane layout matching.

In some embodiments of the present disclosure, as shown in FIG. 1, function areas such as a player area, a banker area, and a betting area in a dotted line range are divided from the plane layout 100 as to-be-matched layout areas 300, and then at least one to-be-matched feature point is extracted from the to-be-matched layout areas 300 to implement subsequent matching.

At S103, for one of at least one reference image, matching is performed between the at least one to-be-matched feature point and at least one reference feature point extracted from the reference image to obtain a distance set corresponding to the reference image, the distance set corresponding to the reference image being a distance set composed of distances between the at least one to-be-matched feature point and the at least one reference feature point, the one reference image including an image of a standard sample, and different reference images including different standard samples.

In the embodiments of the present disclosure, one reference image corresponds to a standard sample of one plane layout. A bird's-eye view of each standard sample is pre-acquired, whether the bird's-eye view of the acquired standard plane layout is clear and not blocked and whether the layout area is complete are determined, and the bird's-eye view of the standard plane layout is subjected to de-distortion processing to serve as the at least one reference image; or a partial image is captured from the acquired and processed bird's-eye view above to serve as the at least one reference image.

In the embodiments of the present disclosure, for each reference image in the at least one reference image, at least one reference feature point is extracted from each reference image.

In some embodiments of the present disclosure, a reference layout area of each reference image is divided from each reference image, and at least one reference feature point is extracted from the reference layout areas.

In the embodiments of the present disclosure, the method for extracting the at least one reference feature point from each reference image is identical to the method in S102 in principles. Details are not described in the embodiments of the present disclosure again.

In the embodiments of the present disclosure, after the at least one to-be-matched feature point and the at least one reference feature point are obtained, for one reference image, matching is performed between the at least one to-be-matched feature point in the to-be-matched image and at least one reference feature point in the reference image to obtain a distance set between the at least one to-be-matched feature point and the at least one reference feature point. The distance set includes multiple distances between the to-be-matched image and the reference images. For the at least one reference image, matching is performed between the to-be-matched image and the reference image by using the same method, so as to obtain at least one distance set of the to-be-matched image corresponding to the at least one reference image.

In the embodiments of the present disclosure, when matching is performed between the at least one to-be-matched feature point and the at least one reference feature point, a force matching method, or other matching algorithms may be used, which is specifically selected according to actual conditions. No limitation is made thereto in the embodiments of the present disclosure.

In the embodiments of the present disclosure, a Hamming distance between the at least one to-be-matched feature point and the at least one reference feature point may be calculated by calculating the distance set therebetween, or an Euler distance therebetween may also be calculated, which is specifically selected according to actual conditions. No limitation is made thereto in the embodiments of the present disclosure.

In the embodiments of the present disclosure, the distance set represents the at least one to-be-matched feature point and the at least one reference feature, that is, a similarity between the to-be-matched image and the reference image. The larger the distance set is, the lower similarity between the to-be-matched image and the reference image is represented; otherwise, the less the distance set is, the higher similarity between the to-be-matched image and the reference image is represented.

At S104, based on the distance set corresponding to each reference image, whether the to-be-matched image matches each reference image is determined.

In the embodiments of the present disclosure, after the distance set corresponding to each reference image is obtained, based on the distance set corresponding to each reference image, whether the to-be-matched image matches each reference image in the at least one reference image is determined to further implement function recognition of the plane layout.

It can be understood that in the embodiments of the present disclosure, whether the current plane layout matches a standard sample, and which standard sample is matched are determined according to the distance set of feature point matching between the to-be-matched image and each reference image, so that preset function implementation in the standard sample is automatically applied in the current plane layout, without manual matching and function configuration, so that the intelligence in image matching is improved.

Figure 3:
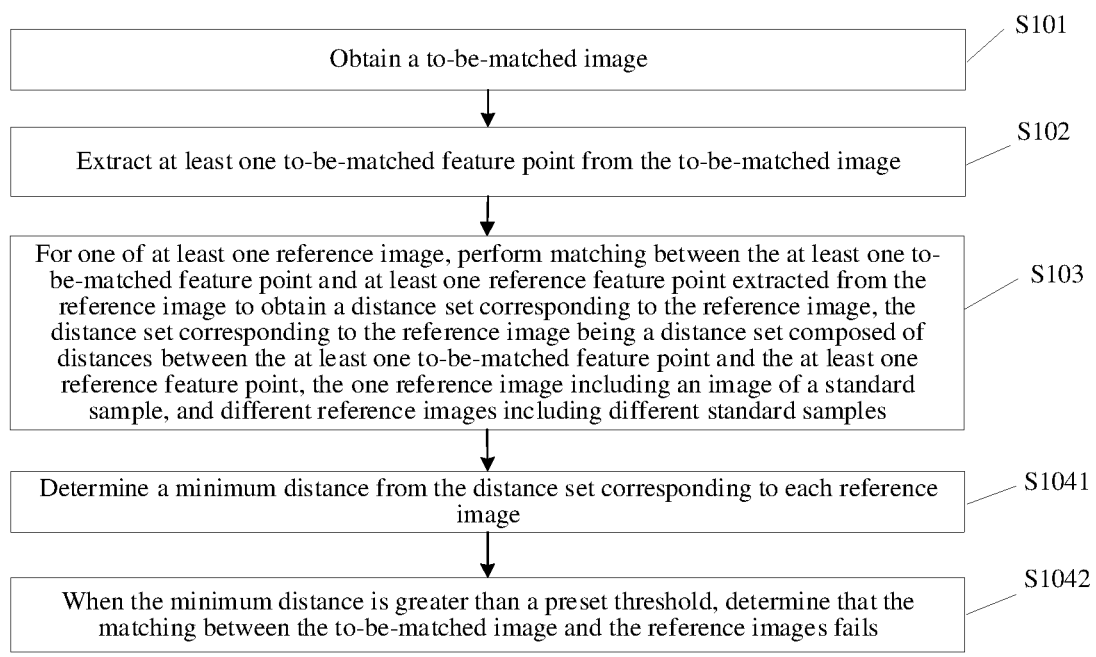
FIG. 3 is a second schematic flowchart of a matching method provided by embodiments of the present disclosure.

In the embodiments of the present disclosure, based on FIG. 2, in S104, based on the at least one distance set, determining whether the to-be-matched image matches at least one reference image includes S1041 and S1042 as shown in FIG. 3 as follows:

At S1041, a minimum distance is determined from the distance set corresponding to each reference image.

In the embodiments of the present disclosure, the distance set corresponding to each reference image includes a distance between the at least one to-be-matched feature point and the at least one reference feature point of the reference image, and the minimum value in all the distances included in the distance set corresponding to each reference image is taken as the minimum distance.

At S1042, when the minimum distance is greater than a preset threshold, it is determined that the matching between the to-be-matched image and each reference image fails.

In the embodiments of the present disclosure, if the minimum distance in the at least one distance set is still greater than a preset threshold, it indicates that the similarity between the to-be-matched image and all the reference image in the at least one reference image is low, and it can be determined that the matching between the current plane layout corresponding to the to-be-matched image and the at least one reference image fails, that is, the current plane layout does not belong to any one of the standard plane layouts.

In the embodiments of the present disclosure, if it is determined that the matching between the to-be-matched image and the at least one reference image fails, alarm prompt information is sent so that the current plane layout can be correspondingly processed, and the problem that the running of corresponding preset function implementation is unable to be continued based on the standard plane layout because matching with the standard plane layouts fails when the current plane layout is monitored.

In the embodiments of the present disclosure, the generated alarm information may be an interface prompt, or may be a sound prompt, or may be a combination of both. No limitation is made thereto in the embodiments of the present disclosure.

In some embodiments of the present disclosure, if an image acquiring module of the monitoring device is blocked, a complete to-be-matched area cannot be captured, or if a new desktop is used in the monitoring scene, based on the fact that the minimum distance is greater than a preset threshold, it is determined that the matching between the current plane layout and each standard plane layout fails, so that an alarm window pops up on a monitoring interface to remind a maintenance personnel to carry out processing as soon as possible. It can be understood that in the embodiments of the present disclosure, whether the to-be-matched image matches a corresponding reference image in the at least one reference image is determined based on the fact whether the minimum distance in the distance set corresponding to each reference image is greater than the preset threshold. If the to-be-matched image cannot match any one of the reference images, it can be found by using the method in the embodiments of the present disclosure and an alarm prompt is further provided.

Figure 4:
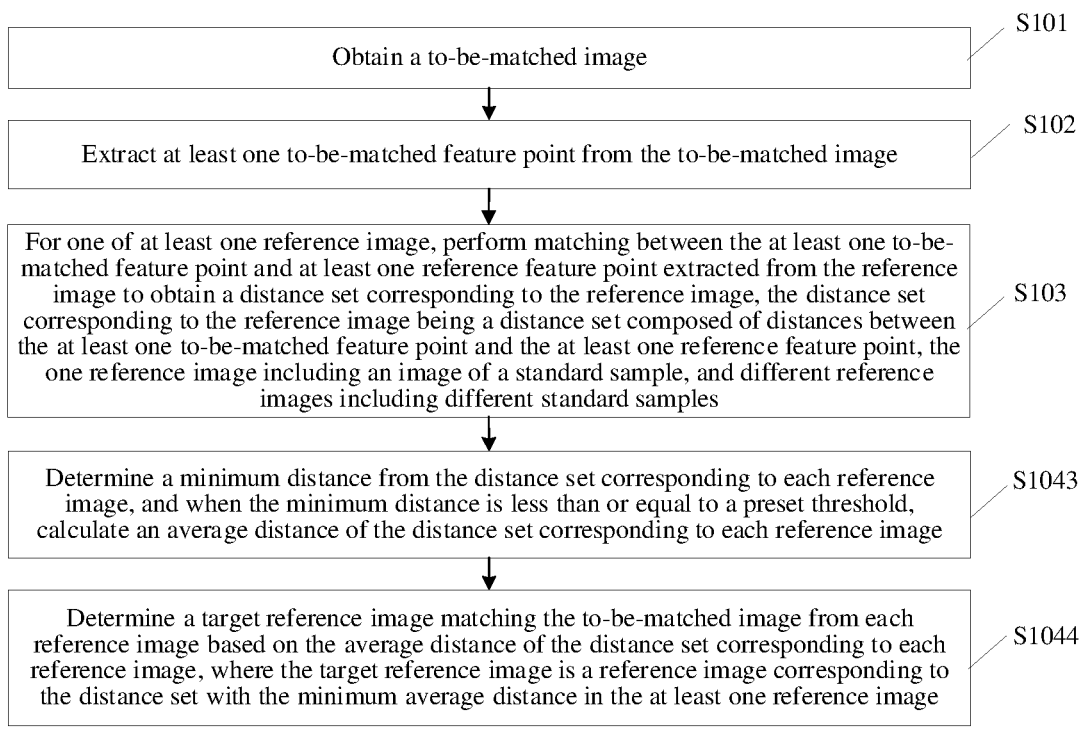
FIG. 4 is a third schematic flowchart of a matching method provided by embodiments of the present disclosure.

In the embodiments of the present disclosure, based on FIG. 2, S104 may further include operations S1043 and S1044 as shown in FIG. 4 as follows:

At S1043, a minimum distance is determined from the distance set corresponding to each reference image, and when the minimum distance is less than or equal to a preset threshold, an average distance of the distance set corresponding to each reference image are calculated.

In the embodiments of the present disclosure, the process of determining the minimum distance in the distance set corresponding to each reference image is the same as S1041. Details are not described herein again In the embodiments of the present disclosure, if the minimum distance is less than or equal to the preset threshold, it indicates that a matching reference image is found from the at least one reference image for the to-be-matched image. In order to find one reference image matching the to-be-matched image from the at least one reference image, an average value of the distances from the at least one to-be-matched feature point included in the distance set corresponding to the reference image to the at least one reference feature point is calculated in the reference image as the average value of the distance set corresponding to the reference image, thereby obtaining an average distance of the distance set corresponding to the reference image.

At S1044, a target reference image matching the to-be-matched image is determined from each reference image based on the average distance of the distance set corresponding to each reference image, where the target reference image is a reference image corresponding to the distance set with the minimum average distance in the at least one reference image.

In the embodiments of the present disclosure, the average distance of the distance set corresponding to each reference image represent the similarity between the to-be-matched image and each reference image, and therefore, in the average distance of the distance set corresponding to each reference image, the reference image corresponding to the minimum average distance is the reference image having the highest similarity with the to-be-matched image.

In the embodiments of the present disclosure, the reference image corresponding to the distance set with the minimum average distance in the at least one reference image is taken as a target reference image matching the to-be-matched image, thereby determining that the current plane layout in the to-be-matched image matches the standard plane layout in the target reference image.

It can be understood that in the embodiments of the present disclosure, if the minimum distance satisfies matching requirements of the preset threshold, the reference image which most closely matches the to-be-matched image and has the highest similarity is determined from the at least one reference image based on the average distance of the distance set corresponding to each reference image, so that mapping of the standard sample to the to-be-matched image is performed based on the matching reference image, and thus preset function implementation in the standard sample is automatically applied in the current plane layout, without steps of manual standard sample matching and function configuration, so that the intelligence in image matching is improved.

Figure 5:
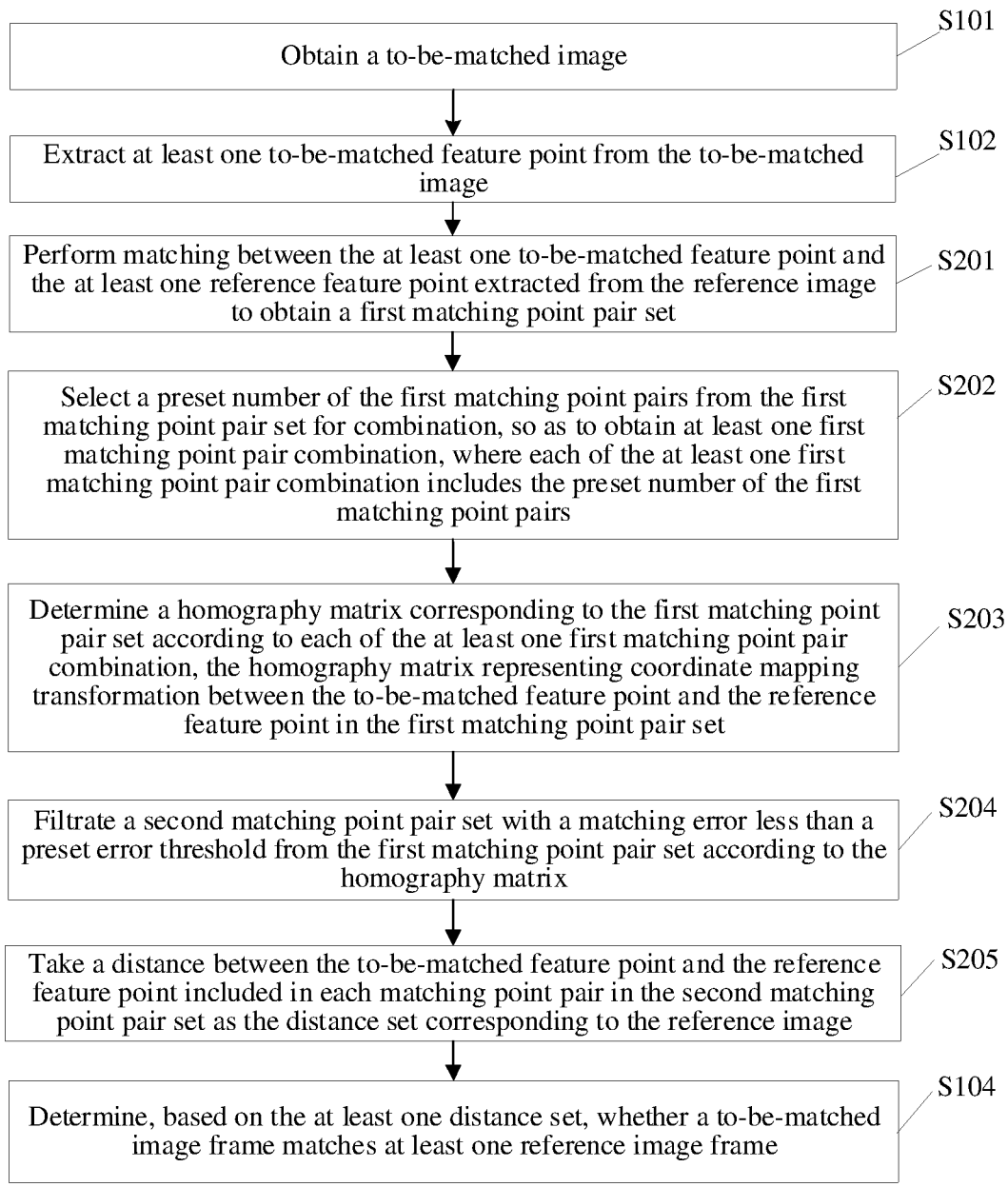
FIG. 5 is a fourth schematic flowchart of a matching method provided by embodiments of the present disclosure.

In the embodiments of the present disclosure, based on FIG. 2, in S103, for one reference in the at least one reference image, performing matching between the at least one to-be-matched feature point and at least one reference feature point extracted from the reference image to obtain a distance set corresponding to the reference image includes operations S201 to S205 as shown in FIG. 5 as follows:

At S201, matching is performed between the at least one to-be-matched feature point and the at least one reference feature point extracted from the reference image to obtain a first matching point pair set.

In the embodiments of the present disclosure, a first matching point pair set is obtained by performing matching between the at least one to-be-matched feature point and the at least one reference feature point using a feature point matching algorithm.

Figure 6:
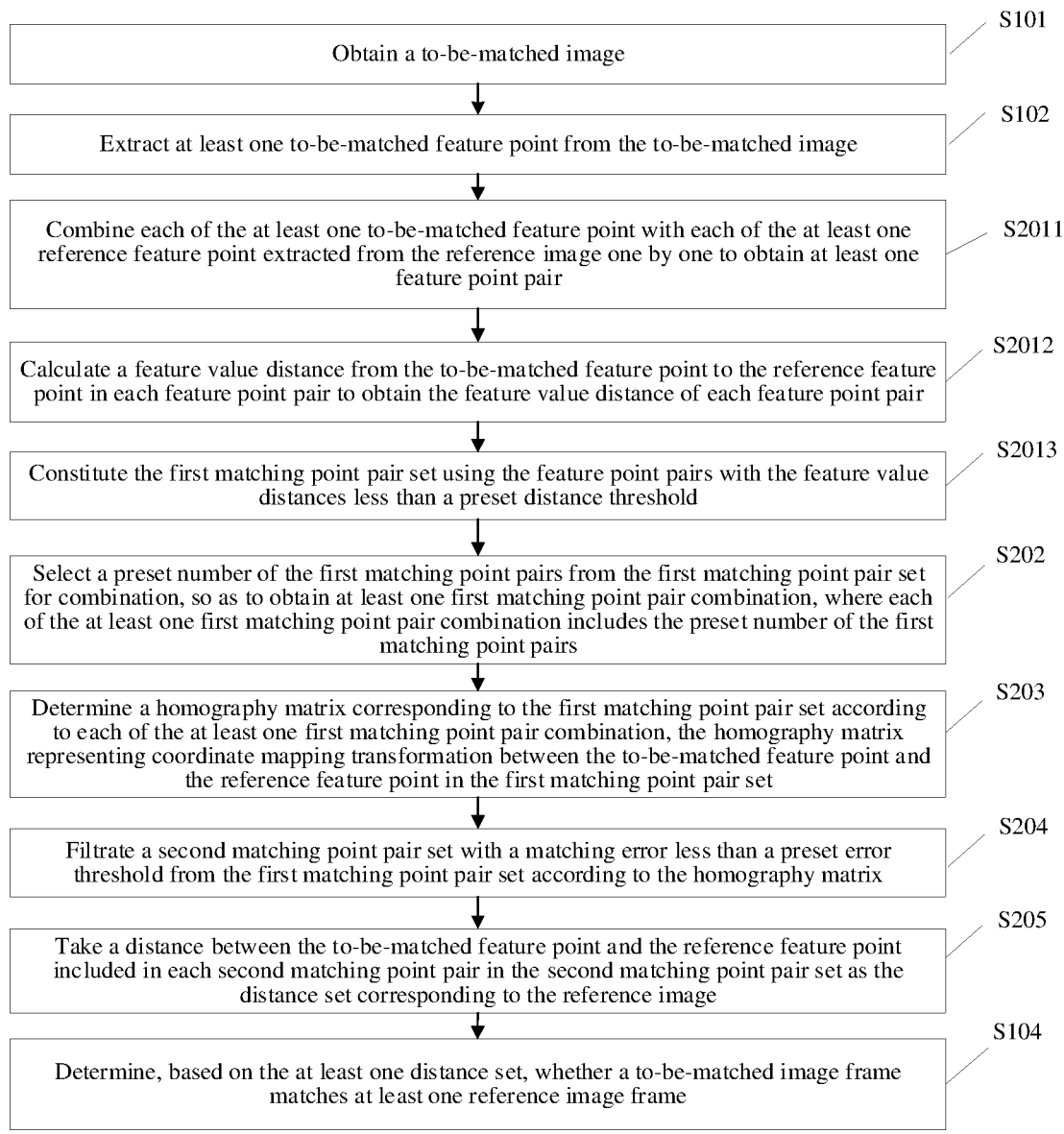
FIG. 6 is a fifth schematic flowchart of a matching method provided by embodiments of the present disclosure.

In the embodiments of the present disclosure, based on FIG. 5, obtaining the first matching point pair set using a force matching method includes operations S2011 to S2013 as specifically shown in FIG. 6 as follows:

At S2011, each of the at least one to-be-matched feature point is combined with each of the at least one reference feature point extracted from the reference image one by one to obtain at least one feature point pair.

At S2012, a feature value distance from the to-be-matched feature point to the reference feature point is calculated in each feature point pair to obtain feature value distances of the feature point pairs.

In the embodiments of the present disclosure, for one feature point pair, a feature value distance from the to-be-matched feature point to the reference feature point is calculated for the feature point to obtain a feature value distance, and the same processing method applies to each feature point pair, so that the feature value distance of each feature point pair is obtained.

In the embodiments of the present disclosure, the calculated feature value distance may be a Hamming distance, or an Euler distance, which is specifically selected according to actual conditions. No limitation is made thereto in the embodiments of the present disclosure.

At S2013, the first matching point pair set is constituted using the feature point pairs with the feature value distances less than a preset distance threshold.

In the embodiments of the present disclosure, a feature value distance less than a preset distance threshold is selected from the feature value distance of each feature point pair, and the feature point pair corresponding to the feature value distance less than the preset distance threshold constitutes the first matching point pair set.

In some embodiments of the present disclosure, regarding the at least one to-be-matched feature point A1, A2, and A3, and the at least one reference feature point B1, B2, and B3, the at least one to-be-matched feature point is combined with each reference feature point one by one, so that nine feature point pairs (A1, B1), (A1, B2), (A1, B3), (A2, B1), (A2, B2), (A21, B3), (A3, B1), (A3, B2), and (A3, B3) are obtained, and the feature value distances from the to-be-matched feature points to the reference feature points in each feature point are calculated, so that nine feature value distances D1 to D9 are correspondingly obtained, where D1=80, D2=90, D3=70, D4=100, D5=60, D6=200, D7=50, D8=30, and D9=150, and a preset distance threshold is 80. The feature point pairs (A3, B2), (A3, B1), (A2, B2), and (A1, B3) corresponding to D8, D7, D5, and D3 are taken as the first matching point pair set.

At S202, a preset number of the first matching point pairs is selected from the first matching point pair set for combination, so as to obtain at least one first matching point pair combination, where each of the at least one first matching point pair combination includes the preset number of the first matching point pairs.

In the embodiments of the present disclosure, a preset number of the first matching point pairs is selected from the first matching point pair set for combination, so as to obtain at least one first matching point pair combination.

In some embodiments of the present disclosure, in the first matching point pairs, four first matching point pairs are randomly selected for combination. In order to improve the computing precision and reduce errors, four matching point pairs may further be randomly selected from the first matching point parts. The step is repeated for 100 times to obtain 100 first matching point pair combinations which are randomly selected, where each combination includes four matching point pairs.

At S203, a homography matrix corresponding to the first matching point pair set is determined according to each of the at least one first matching point pair combination, the homography matrix representing coordinate mapping transformation between the to-be-matched feature point and the reference feature point in the first matching point pair set.

In the embodiments of the present disclosure, an initial homography matrix is calculated using each of the at least one first matching point pair combination, and the value of each matrix element in the homography matrix is calculated based on coordinates of the to-be-matched feature point and the reference feature point in the feature point pair included in the first matching point pair set.

The homography matrix is a mapping relationship of pixel points between two camera coordinate systems when the pixel points on the same plane are mapped from one camera coordinate system to the other camera coordinate system. In the embodiments of the present disclosure, the homography matrix is configured to represent coordinate mapping transformation between the to-be-matched feature point and the reference feature point in the first matching point pair set.

In the embodiments of the present disclosure, a coordinate mapping transformation calculation formula of the first matching point pair set under the effect of the homography matrix is:

$$p_2 = Hp_1 \quad (1)$$

where H represents the homography matrix, $p_1$ and $p_2$ are a matching point pair included in the first matching point pair set, $p_1$ represents coordinates $p_1=(u_1,v_1,1)$ over the coordinate system of the to-be-matched image, and $p_2$ represents coordinates $p_2=(u_2,v_2,1)$ over the coordinate system of the reference image.

After the pixel coordinates of $p_1$ and $p_2$ are substituted into formula (1), the formula is expanded as:

$$\begin{bmatrix} u_2 \\ v_2 \\ 1 \end{bmatrix} = s \begin{bmatrix} h_1 & h_2 & h_3 \\ h_4 & h_5 & h_6 \\ h_7 & h_8 & h_9 \end{bmatrix} \begin{bmatrix} u_1 \\ v_1 \\ 1 \end{bmatrix} \quad (2)$$

In formula (2), $h_1$ to $h_9$ represent the value of each matrix element when the homography matrix is written as a 3*3 matrix, and s represents a non-zero factor. Because the product of the third row of the matrix and $p_1$ is 1, i.e., $h_7 u_1 + h_8 v_1 + h_9 = 1$, the non-zero factor s is required to make the equation satisfied. In some embodiments of the present disclosure, $h_9=1$ is satisfied by using s, and the non-zero factor is removed by using formula (2), thereby obtaining:

$$u_2 = \frac{h_1 u_1 + h_2 v_1 + h_3}{h_7 u_1 + h_8 v_1 + h_9} \quad (3)$$

$$v_2 = \frac{h_4 u_1 + h_5 v_1 + h_6}{h_7 u_1 + h_8 v_1 + h_9} \quad (4)$$

It can be obtained by means of sorting:

$$h_1 u_1 + h_2 v_1 + h_3 - h_7 u_1 u_2 - h_8 v_1 u_2 = u_2 \quad (5)$$

$$h_4 u_1 + h_5 v_1 + h_6 - h_7 u_1 u_2 - h_8 v_1 v_2 = v_2 \quad (6)$$

It can be known from formulas (5) and (6) that two constraint equations of the homography matrix H are obtained according to one matching point pair. The homography matrix H is expanded as a vector:

$$h = [h_1 h_2 h_3 h_4 h_5 h_6 h_7 h_8 h_9] \quad (7)$$

$$h_9 - 1 \quad (8)$$

Similarly, if one first matching point pair combination includes four matching point pairs, eight equations related with the homography matrix are obtained based on the four matching point pairs, where it is known that the value of $h_9$ is equal to 1. In this way, the value of each matrix element in the homography matrix is obtained by solving linear equations.

In the embodiments of the present disclosure, Direct Linear Transform (DLT) is generally used in calculation modes for solving linear equations, and other methods may also be used according to actual conditions. No limitation is made thereto in the embodiments of the present disclosure.

At S204, a second matching point pair set with a matching error less than a preset error threshold is filtrated from the first matching point pair set according to the homography matrix.

In the embodiments of the present disclosure, after the homography matrix is obtained, filtrating is performed on the first matching point pair set according to the homography matrix, so that correct matching point pairs with matching errors less than a preset error threshold are filtrated as a second matching point pair set.

Figure 7:
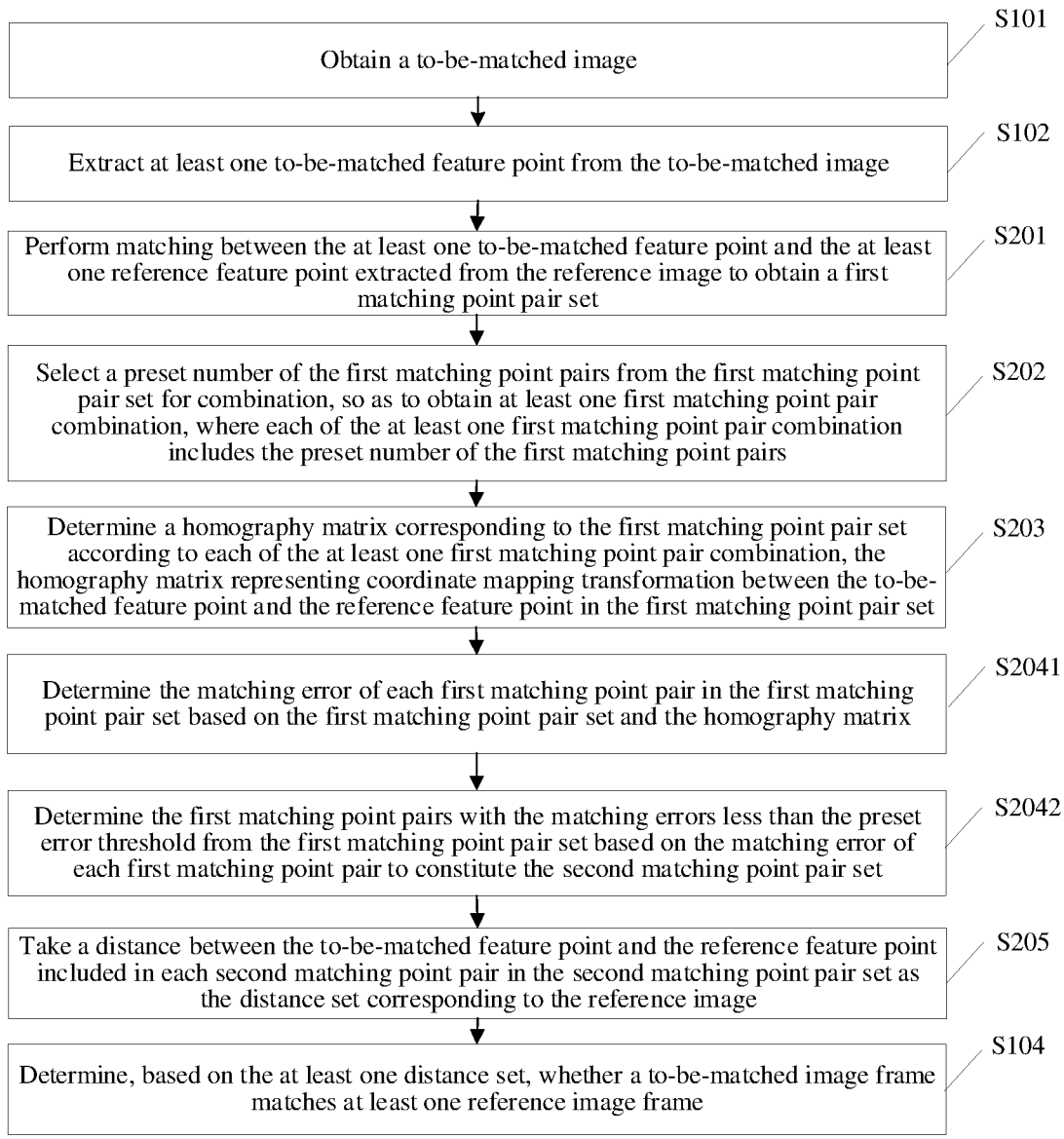
FIG. 7 is a sixth schematic flowchart of a matching method provided by embodiments of the present disclosure.

In the embodiments of the present disclosure, based on FIG. 5, in S204, filtrating the second matching point pair set with the matching error less than the preset error threshold from the first matching point pair set according to the homography matrix includes operations S2041 and S2042 as shown in FIG. 7 as follows:

At S2041, the matching error of each first matching point pair in the first matching point pair set is determined based on the first matching point pair set and the homography matrix.

In the embodiments of the present disclosure, the matching error of each first matching point pair in the first matching point pair set is determined based on the first matching point pair set and the homography matrix according to the following formulas:

$$u_2 = \frac{h_1 u_1 + h_2 v_1 + h_3}{h_7 u_1 + h_8 v_1 + h_9} \quad (9)$$

$$v_2 = \frac{h_4 u_1 + h_5 v_1 + h_6}{h_7 u_1 + h_8 v_1 + h_9} \quad (10)$$

In formulas (9) and (10), $u_2'$ and $v_2'$ are unknown intermediate parameters, and after $u_2'$ and $v_2'$ are calculated, the value of error is calculated using a homography matrix error calculation formula (11):

$$\text{error} = (u_2 - u_2')^2 + (v_2 - v_2')^2 \quad (11)$$

where the value of error calculated according to formula (11) represents an error of a matching point pair under the effect of a homography matrix, and the error is taken as a matching error of one first matching point pair under the effect of the homography matrix.

In the embodiments of the present disclosure, using the same method, the error of each first matching point pair in the first matching point pair set under the effect of the homography matrix is calculated and serves as the matching error of each first matching point pair in the first matching point pair set.

At S2042, the first matching point pairs with the matching errors less than the preset error threshold are determined from the first matching point pair set based on the matching error of each first matching point pair to constitute the second matching point pair set.

In the embodiments of the present disclosure, the first matching point pair with a matching error less than the preset error threshold is determined from the first matching point pair set to constitute the second matching point pair set.

At S205, a distance between the to-be-matched feature point and the reference feature point included in each matching point pair in the second matching point pair set are taken as the distance set corresponding to the reference image.

In the embodiments of the present disclosure, for one reference image, after the second matching point pair set is obtained, in the second matching point pair set, the distance between the to-be-matched feature point and the reference feature point included in each second matching point pair is calculated to constitute a distance set corresponding to the reference image, so that whether the to-be-matched image matches each reference image is determined according to the distance set corresponding to each reference image.

It can be understood that in the embodiments of the present disclosure, for one reference image, matching is performed between the at least one to-be-matched feature point and the at least one reference feature point, and the distance set of the to-be-matched image corresponding to the reference image is obtained by using a homography matrix quantitative matching result, where the distance set corresponding to the reference image represents the similarity between the reference image and the to-be-matched image, and using the distance set corresponding to each reference image in the at least one reference image, the similarity between the to-be-matched image and each reference image is determined, and thus whether the to-be-matched image matches each reference image is determined.

Figure 8:
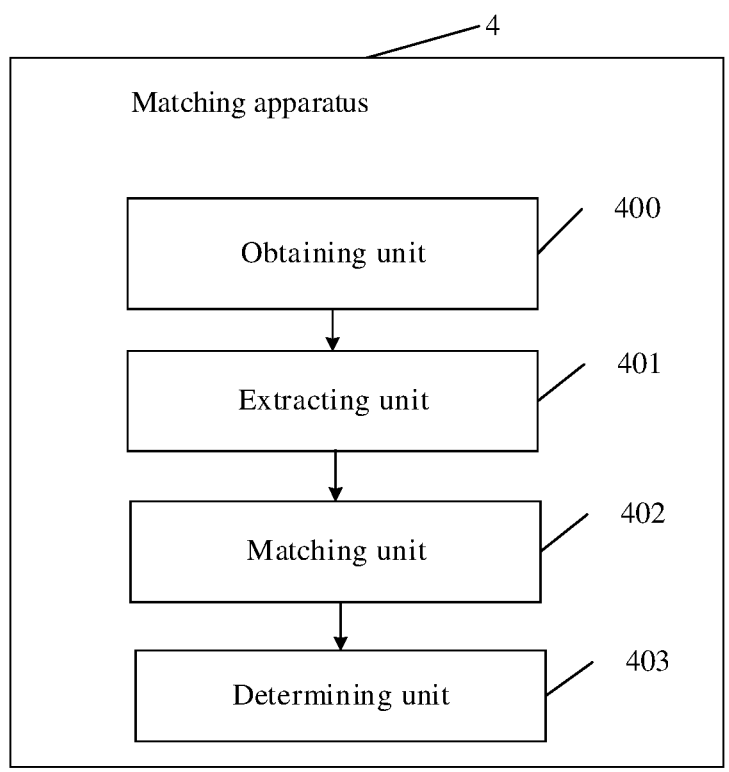
FIG. 8 is a schematic structural diagram of a matching apparatus provided by embodiments of the present disclosure.

The embodiments of the present disclosure provide a matching apparatus 4. As shown in FIG. 8, the matching apparatus includes an obtaining unit 400, an extracting unit 401, a matching unit 402, and a determining unit 403, where
the obtaining unit 400 is configured to obtain a to-be-matched image;
the extracting unit 401 is configured to extract at least one to-be-matched feature point from the to-be-matched image;
the matching unit 402 is configured to, for one of at least one reference image, perform matching between the at least one to-be-matched feature point and at least one reference feature point extracted from the reference image to obtain a distance set corresponding to the reference image, the distance set corresponding to the reference image being a distance set composed of distances between the at least one to-be-matched feature point and the at least one reference feature point, the one reference image including an image of a standard sample, and different reference images including different standard samples; and
the determining unit 403 is configured to determine, based on the distance set corresponding to each reference image, whether the to-be-matched image matches each reference image.

In some embodiments of the present disclosure, the determining unit 403 includes a first determining subunit and a second determining subunit, where
the first determining subunit is configured to determine a minimum distance from the distance set corresponding to each reference image; and
the second determining subunit is configured to, when the minimum distance is greater than a preset threshold, determine that the matching between the to-be-matched image and each reference image fails.

In some embodiments of the present disclosure, the determining unit 403 further includes a third determining subunit and a fourth determining subunit, where
the third determining subunit is configured to determine the minimum distance from the distance set corresponding to each reference image, and when the minimum distance is less than or equal to the preset threshold, calculate an average distance of the distance set corresponding to each reference image; and
the fourth determining subunit is configured to determine a target reference image matching the to-be-matched image from each reference image based on the average distance of the distance set corresponding to each reference image, where the target reference image is a reference image corresponding to the distance set with the minimum average distance in the at least one reference image.

In some embodiments of the present disclosure, the matching unit 402 includes a first matching subunit, a first combining unit, a fifth determining subunit, a filtrating unit, and a sixth determining subunit, where the first matching subunit is configured to perform matching between the at least one to-be-matched feature point and the at least one reference feature point extracted from the reference image to obtain a first matching point pair set;

the first combining unit is configured to select a preset number of the first matching point pairs from the first matching point pair set for combination, so as to obtain at least one first matching point pair combination, where each of the at least one first matching point pair combination includes the preset number of the first matching point pairs;

the fifth determining subunit is configured to determine a homography matrix corresponding to the first matching point pair set according to each of the at least one first matching point pair combination, the homography matrix representing coordinate mapping transformation between the to-be-matched feature point and the reference feature point in the first matching point pair set;

the filtrating unit is configured to filtrate a second matching point pair set with a matching error less than a preset error threshold from the first matching point pair set according to the homography matrix; and the sixth determining subunit is configured to take a distance between the to-be-matched feature point and the reference feature point included in each matching point pair in the second matching point pair set as the distance set corresponding to the reference image.

In some embodiments of the present disclosure, the first matching subunit includes a second combining unit, a calculating unit, and a constituting unit, where the second combining unit is configured to combine each of the at least one to-be-matched feature point with each of the at least one reference feature point extracted from the reference image one by one to obtain at least one feature point pair;

the calculating unit is configured to calculate a feature value distance from the to-be-matched feature point to the reference feature point in each feature point pair to obtain the feature value distance of each feature point pair; and the constituting unit is configured to constitute the first matching point pair set using at least one feature point pair with the feature value distances less than a preset distance threshold.

In some embodiments of the present disclosure, the filtrating unit includes the fifth determining subunit and the sixth determining subunit, where the fifth determining subunit is configured to determine the matching error of each first matching point pair in the first matching point pair set based on the first matching point pair set and the homography matrix; and the sixth determining subunit is configured to determine at least one first matching point pairs with the matching errors less than the preset error threshold from the first matching point pair set based on the matching error of each first matching point pair to constitute the second matching point pair set.

In some embodiments of the present disclosure, the extracting unit 401 includes a selecting unit and a feature extracting unit, where the selecting unit is configured to select at least one original pixel point from the to-be-matched image, where in a preset range of one selected original pixel point, a preset number of target pixel points with grayscale values different from the grayscale value of the selected original pixel point exist; and the feature extracting unit is configured to extract a feature for the target pixel points of the one selected original pixel point to obtain one to-be-matched feature point.

It can be understood that in the embodiments of the present disclosure, the matching apparatus extracts the to-be-matched feature point from the to-be-matched image of the current plane layout, performs matching with the reference feature point in the standard sample in the at least one reference image to obtain the distance set between the to-be-matched image and each reference image, and thus determines, according to the distance set between the to-be-matched image and each reference image, whether the current plane layout matches a standard sample and which standard sample is matched, so that preset function implementation in the standard sample is automatically applied in the current plane layout, without manual matching and function configuration, so that the intelligence in plane layout function image matching is improved.

Figure 9:
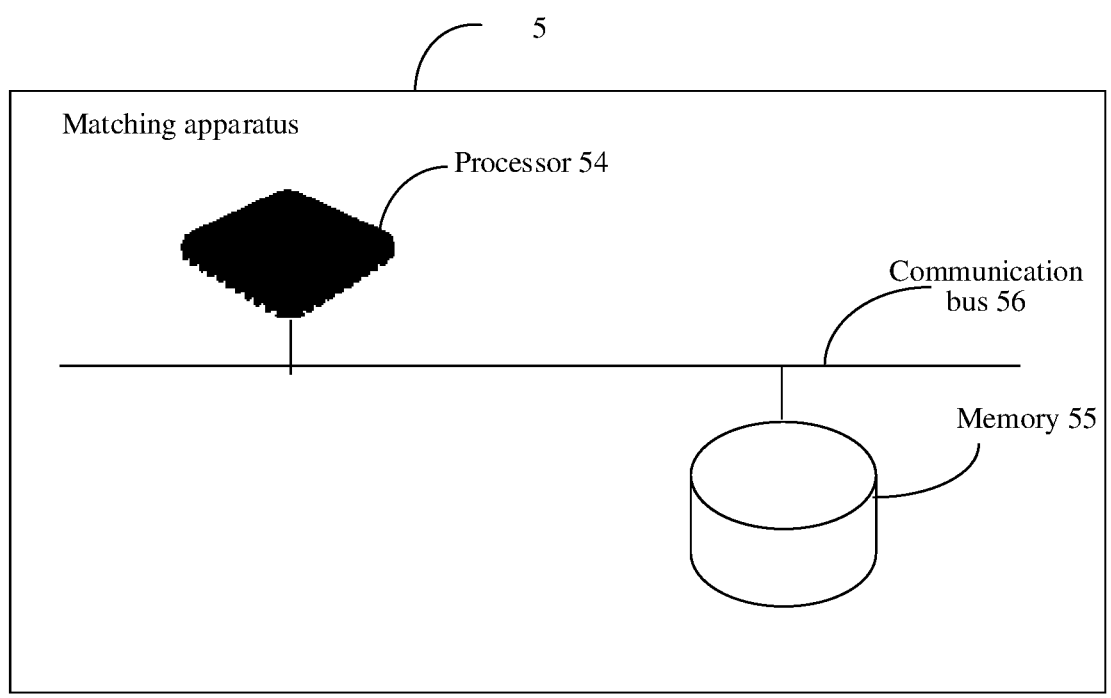
FIG. 9 is another schematic structural diagram of a matching apparatus provided by embodiments of the present disclosure.

The embodiments of the present disclosure provide an electronic device 5, where as shown in FIG. 9, the electronic device 5 includes a processor 54, a memory 55, and a communication bus 56, the memory 55 communicates with the processor 54 by means of the communication bus 56, the memory 55 stores one or more programs executable by the processor 54, and if the one or more programs are executed, the processor 54 executes the plane layout matching method according to any one of the foregoing embodiments.

The embodiments of the present disclosure provide a computer-readable storage medium, having stored thereon one or more computer-readable instructions, where the one or more computer-readable instructions may be executed by one or more processors 54 so as to realize the plane layout matching method according to any one of the foregoing embodiments.

The embodiments of the present disclosure provide a computer program, comprising computer-readable codes, wherein execution of the computer-readable codes by a computer causes the computer to execute the plane layout matching method according to any one of the foregoing embodiments.

A person skilled in the art should understand that the embodiments of the present disclosure may provide a method, a system or a computer program product. Therefore, the present disclosure may use the forms of hardware embodiments, software embodiments, or the embodiments of combining software and hardware aspects. Moreover, the present disclosure may use the form of the computer program product implemented over one or more computer usable storage mediums (including but not limited to a disk memory and an optical memory, etc.) that include a computer usable program code.

The present disclosure is described with reference to flowcharts and/or block diagrams of methods, devices (systems), and computer program products of the embodiments of the present disclosure. It should be understood that a computer program instruction is configured to implement each flow and/or block in the flowcharts and/or block diagrams, and the combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the operations for implementing the functions specified in one or more flows in the flowchart and/or one or more blocks in the block diagram.

The foregoing descriptions are merely preferred embodiments of the present disclosure, but are not intended to limit the scope of protection of the present disclosure.

The invention claimed is:

1. A matching method, comprising:
obtaining a to-be-matched image;
extracting at least one to-be-matched feature point from the to-be-matched image;
performing, for one of at least one reference image, matching between the at least one to-be-matched feature point and at least one reference feature point extracted from the reference image to obtain a distance set corresponding to the reference image, wherein the distance set corresponding to the reference image comprises a set of distances composed of distances between the at least one to-be-matched feature point and the at least one reference feature point, one reference image comprises an image of a standard sample, and different reference images comprise different standard samples; and
determining, based on the distance set corresponding to each reference image, whether the to-be-matched image matches each reference image, which comprises:
determining a minimum distance from the distance set corresponding to each reference image, and calculating, in response to the minimum distance being less than or equal to a preset threshold, an average distance of all distances in the distance set corresponding to each reference image; and
determining a target reference image matching the to-be-matched image from each reference image based on the average distance of the distance set corresponding to each reference image, wherein the target reference image is a reference image, corresponding to the distance set with a minimum average distance, in the at least one reference image.

2. The method according to claim 1, wherein determining, based on the distance set corresponding to each reference image, whether the to-be-matched image matches each reference image comprises:
determining, in response to the minimum distance being greater than the preset threshold, that the matching between the to-be-matched image and each reference image fails.

3. The method according to claim 1, wherein performing, for the one reference image, matching between the at least one to-be-matched feature point and the at least one reference feature point extracted from the reference image to obtain the distance set corresponding to the reference image comprises:
performing matching between the at least one to-be-matched feature point and the at least one reference feature point extracted from the reference image to obtain a first matching point pair set;
selecting a preset number of the first matching point pairs from the first matching point pair set for combination, to obtain at least one first matching point pair combination, wherein each of the at least one first matching point pair combination comprises the preset number of the first matching point pairs;
determining a homography matrix corresponding to the first matching point pair set according to each of the at least one first matching point pair combination, the homography matrix representing coordinate mapping transformation between the to-be-matched feature point and the reference feature point in the first matching point pair set;
filtrating a second matching point pair set with a matching error less than a preset error threshold, from the first matching point pair set according to the homography matrix; and
taking a distance between the to-be-matched feature point and the reference feature point comprised in each matching point pair in the second matching point pair set as the distance set corresponding to the reference image.

4. The method according to claim 3, wherein performing matching between the at least one to-be-matched feature point and the at least one reference feature point extracted from the reference image to obtain the first matching point pair set comprises:
combining each of the at least one to-be-matched feature point with each of the at least one reference feature point extracted from the reference image one by one to obtain at least one feature point pair;
calculating a feature value distance from the to-be-matched feature point to the reference feature point in each feature point pair to obtain the feature value distance of each feature point pair; and
constituting the first matching point pair set by using at least one feature point pair of which the feature value distance is less than a preset distance threshold.

5. The method according to claim 3, wherein filtrating the second matching point pair set with the matching error less than the preset error threshold, from the first matching point pair set according to the homography matrix comprises:
determining a matching error of each first matching point pair in the first matching point pair set based on the first matching point pair set and the homography matrix; and
determining, based on the matching error of each first matching point pair, at least one first matching point pair of which the matching error is less than the preset error threshold, from the first matching point pair set to constitute the second matching point pair set.

6. The method according to claim 1, wherein extracting the at least one to-be-matched feature point from the to-be-matched image comprises:
selecting at least one original pixel point from the to-be-matched image, wherein in a preset range of one of the selected at least one original pixel point, a preset number of target pixel points with grayscale values different from a grayscale value of the selected original pixel point exist; and extracting a feature for the target pixel points of the one selected original pixel point to obtain the to-be-matched feature point.

7. The method according to claim 1, wherein the to-be-matched image is an image of a tablecloth on a game table, the image of the tablecloth comprising one or more-a patterns on the tablecloth.

8. The method according to claim 1, further comprising: generating prompt information responsive to determining that the matching between the to-be-matched image and each reference image fails.

9. A matching apparatus, comprising: a processor; and a memory configured to store computer instructions executable by the processor,
wherein the processor is configured to:
obtain a to-be-matched image;
extract at least one to-be-matched feature point from the to-be-matched image;
perform, for one of at least one reference image, matching between the at least one to-be-matched feature point and at least one reference feature point extracted from the reference image to obtain a distance set corresponding to the reference image, wherein the distance set corresponding to the reference image comprises a set of distances composed of distances between the at least one to-be-matched feature point and the at least one reference feature point, one reference image comprises an image of a standard sample, and different reference images comprise different standard samples; and
determine, based on the distance set corresponding to each reference image, whether the to-be-matched image matches each reference image,
wherein processor is further configured to:
determine a minimum distance from the distance set corresponding to each reference image, and calculate, in response to the minimum distance being less than or equal to a preset threshold, an average distance of all distances in the distance set corresponding to each reference image; and
determine a target reference image matching the to-be-matched image from each reference image based on the average distance of the distance set corresponding to each reference image, wherein the target reference image is a reference image, corresponding to the distance set with a minimum average distance, in the at least one reference image.

10. The apparatus according to claim 9, wherein the processor is further configured to:
determine, in response to the minimum distance being greater than the preset threshold, that the matching between the to-be-matched image and each reference image fails.

11. The apparatus according to claim 9, wherein processor is further configured to:
perform matching between the at least one to-be-matched feature point and the at least one reference feature point extracted from the reference image to obtain a first matching point pair set;
select a preset number of the first matching point pairs from the first matching point pair set for combination, to obtain at least one first matching point pair combination, wherein each of the at least one first matching point pair combination comprises the preset number of the first matching point pairs;
determine a homography matrix corresponding to the first matching point pair set according to each of the at least one first matching point pair combination, the homography matrix representing coordinate mapping transformation between the to-be-matched feature point and the reference feature point in the first matching point pair set;
filtrate a second matching point pair set with a matching error less than a preset error threshold, from the first matching point pair set according to the homography matrix; and
take a distance between the to-be-matched feature point and the reference feature point comprised in each matching point pair in the second matching point pair set as the distance set corresponding to the reference image.

12. The apparatus according to claim 11, wherein the processor is further configured to:
combine each of the at least one to-be-matched feature point with each of the at least one reference feature point extracted from the reference image one by one to obtain at least one feature point pair;
calculate a feature value distance from the to-be-matched feature point to the reference feature point in each feature point pair to obtain the feature value distance of each feature point pair; and
constitute the first matching point pair set by using at least one feature point pair of which the feature value distance is less than a preset distance threshold.

13. The apparatus according to claim 11, wherein the processor is further configured to:
determine a matching error of each first matching point pair in the first matching point pair set based on the first matching point pair set and the homography matrix; and
determine, based on the matching error of each first matching point pair, at least one first matching point pair of which the matching error is less than the preset error threshold, from the first matching point pair set to constitute the second matching point pair set.

14. The apparatus according to claim 9, wherein the processor is further configured to:
select at least one original pixel point from the to-be-matched image, wherein in a preset range of one of the selected at least one original pixel point, a preset number of target pixel points with grayscale values different from a grayscale value of the selected original pixel point exist; and
extract a feature for the target pixel points of the one selected original pixel point to obtain the to-be-matched feature point.

15. The apparatus according to claim 9, wherein the to-be-matched image is an image of a tablecloth on a game table, the image of the tablecloth comprising one or more patterns on the tablecloth.

16. The apparatus according to claim 9, wherein the processor is further configured to:
generate prompt information responsive to determining that the matching between the to-be-matched image and each reference image fails.

17. A non-transitory computer-readable storage medium, having stored thereon computer-readable instructions that, when being executed by one or more processors, cause the one or more processors to implement a matching method, the method comprising:
obtaining a to-be-matched image;
extracting at least one to-be-matched feature point from the to-be-matched image;
performing, for one of at least one reference image, matching between the at least one to-be-matched feature point and at least one reference feature point extracted from the reference image to obtain a distance set corresponding to the reference image, wherein the distance set corresponding to the reference image comprises a set of distances composed of distances between the at least one to-be-matched feature point and the at least one reference feature point, one reference image comprises an image of a standard sample, and different reference images comprise different standard samples; and determining, based on the distance set corresponding to each reference image, whether the to-be-matched image matches each reference image, which comprises:
  determining a minimum distance from the distance set corresponding to each reference image, and calculating, in response to the minimum distance being less than or equal to a preset threshold, an average distance of all distances in the distance set corresponding to each reference image; and
  determining a target reference image matching the to-be-matched image from each reference image based on the average distance of the distance set corresponding to each reference image, wherein the target reference image is a reference image, corresponding to the distance set with a minimum average distance, in the at least one reference image.

18. The non-transitory computer-readable storage medium according to claim 17, wherein determining, based on the distance set corresponding to each reference image, whether the to-be-matched image matches each reference image comprises:
  determining, in response to the minimum distance being greater than the preset threshold, that the matching between the to-be-matched image and each reference image fails.

19. The non-transitory computer-readable storage medium according to claim 17, wherein performing, for the one reference image, matching between the at least one to-be-matched feature point and the at least one reference feature point extracted from the reference image to obtain the distance set corresponding to the reference image comprises:
  performing matching between the at least one to-be-matched feature point and the at least one reference feature point extracted from the reference image to obtain a first matching point pair set;
  selecting a preset number of the first matching point pairs from the first matching point pair set for combination, to obtain at least one first matching point pair combination, wherein each of the at least one first matching point pair combination comprises the preset number of the first matching point pairs;
  determining a homography matrix corresponding to the first matching point pair set according to each of the at least one first matching point pair combination, the homography matrix representing coordinate mapping transformation between the to-be-matched feature point and the reference feature point in the first matching point pair set;
  filtrating a second matching point pair set with a matching error less than a preset error threshold, from the first matching point pair set according to the homography matrix; and
  taking a distance between the to-be-matched feature point and the reference feature point comprised in each matching point pair in the second matching point pair set as the distance set corresponding to the reference image.

20. The non-transitory computer-readable storage medium according to claim 19, wherein performing matching between the at least one to-be-matched feature point and the at least one reference feature point extracted from the reference image to obtain the first matching point pair set comprises:
  combining each of the at least one to-be-matched feature point with each of the at least one reference feature point extracted from the reference image one by one to obtain at least one feature point pair;
  calculating a feature value distance from the to-be-matched feature point to the reference feature point in each feature point pair to obtain the feature value distance of each feature point pair; and
  constituting the first matching point pair set by using at least one feature point pair of which the feature value distance is less than a preset distance threshold.

* * * * *